United States Patent
Suzuki

(12) 
(10) Patent No.: US 6,574,475 B1
(45) Date of Patent: Jun. 3, 2003

(54) MOBILE COMMUNICATION SYSTEM CAPABLE OF PERFORMING SOFT-HANDOVER BETWEEN BASE STATION CONTROLLERS CONNECTED TO DIFFERENT MOBILE COMMUNICATION EXCHANGES

(75) Inventor: Takayuki Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/383,215

(22) Filed: Aug. 26, 1999

(30) Foreign Application Priority Data

Aug. 26, 1998 (JP) .......................................... 10-240526

(51) Int. Cl.⁷ ................................................ H04Q 7/20
(52) U.S. Cl. ...................................... 455/438; 455/442
(58) Field of Search ................................ 455/422, 432, 455/436, 442, 560, 561, 437, 438, 439, 440

(56) References Cited

U.S. PATENT DOCUMENTS

| | | | | |
|---|---|---|---|---|
| 5,345,448 A | * | 9/1994 | Keskitalo | 370/337 |
| 5,471,644 A | * | 11/1995 | Schatz et al. | 455/436 |
| 5,749,053 A | * | 5/1998 | Kusaki et al. | 455/524 |
| 5,930,714 A | * | 7/1999 | Abu-Amara et al. | 455/442 |
| 6,108,549 A | * | 8/2000 | Bonta | 455/446 |
| 6,131,030 A | * | 10/2000 | Schon et al. | 455/438 |
| 6,173,183 B1 | * | 1/2001 | Abu-Amara et al. | 455/442 |
| 6,212,380 B1 | * | 4/2001 | Laatu | 455/436 |

FOREIGN PATENT DOCUMENTS

| | | | |
|---|---|---|---|
| JP | 9-505948 | 6/1997 | |
| JP | 10-145834 | 5/1998 | |
| WO | 95/04438 | * 2/1995 | H04Q/7/00 |
| WO | WO 95/04438 | 2/1995 | |
| WO | WO 95/15665 | 6/1995 | |
| WO | 96/36191 | * 11/1996 | H04Q/7/22 |
| WO | WO 96/36191 | 11/1996 | |

* cited by examiner

Primary Examiner—Dwayne Bost
Assistant Examiner—Joy K. Contee
(74) Attorney, Agent, or Firm—Sughrue Mion,. PLLC

(57) ABSTRACT

A mobile communication system comprises connection lines as communication lines and a control signal line for transmission/reception of a control signal between base station controllers. In soft-handover control sections arranged within the base station controllers, respectively, the connection lines are established with reference to received electric field strength at a mobile terminal. Switching sections arranged within the base station controllers, respectively, perform path-connection among the communication lines, the soft-handover control sections, a QCELP/PCM conversion section of communicating base station controller, the connection lines, and the control signal line.

15 Claims, 7 Drawing Sheets

MOBILE COMMUNICATION SYSTEM CAPABLE OF PERFORMING SOFT-HANDOVER BETWEEN BASE STATION CONTROLLERS CONNECTED TO DIFFERENT MOBILE COMMUNICATION EXCHANGES

BACKGROUND OF THE INVENTION

This invention relates to a mobile communication system and, in particular, to a soft-handover technique between base station controllers of the mobile communication system.

Conventionally, a handover technique is used in a mobile communication system to prevent the communication from being interrupted when a mobile terminal is moved among cells. A soft-handover technique is known as one type of the handover technique and indispensable to a CDMA communication system.

In general, the soft-handover technique is applied to each mobile service switching center (or mobile communication exchange) of the mobile communication system. In other words, each mobile service switching center independently performs the soft-handover. Thus, a hard-handover technique is used when the mobile terminal moves from an service area covered by the mobile service switching center to another service area covered by another mobile service switching center. The hard-handover brings about problems, such as instantaneous disconnection of the communication, deterioration of speech quality of the communication, etc.

A conventional soft-handover technique for performing of the soft-handover between base stations connected to different mobile service switching centers is disclosed in Japanese Unexamined Patent Publication No. Hei 09-505948. The soft-handover technique is used in a mobile communication system which comprises mobile communication exchanges, base stations, and at least one mobile terminal.

In the mobile communication system, each of mobile communication exchanges can perform the soft-handover both between base stations connected to it and between base stations connected to it and to another mobile communication exchange. Therefore, throughout a whole cellular service area, a seamless soft-handover with a signal diversity synthesis can be achieved between the base stations connected to different mobile communication exchanges.

For example, it is assumed that the mobile terminal is located in a first cell covered by a first base station connected to a first mobile communication exchange and communicates with the other system user (or terminal) through the first base station and the first mobile communication exchange. The first mobile communication exchange receives user information signals sent from the mobile terminal through the first base station and performs the signal diversity synthesis of the received user information signals to form a synthesized user information signal and to send the other system user the synthesized user information. Under this situation, when the mobile terminal moves from the first cell to a second cell adjacent to the first cell and covered by a second base station connected to a second mobile communication exchange, connection between the mobile station and the second mobile communication exchange is established through the second base station. The second mobile communication exchange relays user information signals, which is sent from the mobile station and which is received by the second base station, to the first communication exchange. The first mobile communication exchange carries out signal diversity synthesis of the user information signals received by the first and the second base station to transmit a new synthesized user information signal to the other system user.

However, the conventional soft-handover technique can not applied to a larger mobile communication system, such as a mobile communication system having base station controllers between mobile communication exchanges and the base stations.

Moreover, the conventional soft-handover technique requires a line or channel via the mobile communication exchanges because the handover is performed between the mobile communication exchanges. It is therefore necessary to provide another device for synthesizing speech signal and data signal. This leads to the problem that the system is increased in scale.

Furthermore, each of the mobile communication exchanges must store cell ID analysis information for the whole system.

Another conventional soft-handover technique for performing of the soft-handover between base stations connected to different mobile communication exchanges is disclosed in Japanese Unexamined Patent Publication No. Hei 10-145834. The soft-handover technique is applied to a mobile communication system which comprises mobile communication exchanges, base stations, at least one mobile terminal, and lines each of which connects between two base stations adjacent to each other. The lines are logically independent of the mobile communication exchanges.

In the mobile communication system, traffic information signals are exchanged between two base stations adjacent to each other to carry out the soft-handover when the mobile station moves between two cells covered by the two base stations. The soft-handover can be carried out even if the base stations are connected to different mobile communication exchanges.

However, the leading base station, which is one of the two base stations and leads the soft-handover, is changed from one to the other with the movement of the mobile station, according to the soft-handover technique. This certainly brings necessity of a hard-handover when the soft-handover is carried out between the base stations connected to the different mobile communication exchanges. Consequently, the soft-handover can hardly decrease frequency of the hard-handover.

SUMMARY OF THE INVENTION

It is therefore an object of this invention to provide a mobile communication system capable of achieving soft-handover between base station controllers connected to different mobile communication exchanges.

It is another object of this invention to provide a mobile communication system capable of achieving soft-handover without increasing the scale of the system and without storing cell ID analysis information of the whole system in each of base station controllers.

It is still another object of this invention to provide a mobile communication system capable of decreasing frequency of hard-handover.

Other object of this invention will become clear as the description proceeds.

On describing the gist of this invention, it is possible to understand that a mobile communication system includes a plurality of base stations having cells for being connected to a mobile terminal by radio and a plurality of base station controllers connected between the base stations and a mobile exchange.

According to the gist of this invention, the mobile communication system comprises control signal lines connected among the base station controllers for translating control signals to perform soft-handover and to put concerning base station controllers into a soft-handover state regardless of the mobile exchange when the mobile terminal moves between cells. Connection lines is connected among the base station controllers for keeping communication between the mobile terminal and another terminal in the soft-handover state. Each of the base station controllers keep transmitting/receiving communication signals to/from the mobile exchange regardless location of the mobile terminal, when the communication starts through it.

In the mobile communication system, the base stations broadcast predetermine radio waves over the cells, respectively. The mobile terminal detects the predetermined radio waves to produce a field strength report signal representative of the predetermined radio waves. Each of the base station controllers comprises a soft-handover control section to perform the soft-handover on the basis of the field strength report signal. A conversion section converts the communication signals between a first type for the base stations and a second type for the mobile exchange. A switching section is connected to the soft-handover control section, the conversion section, predetermined base stations of the base stations, the predetermined connections lines of the base stations, and predetermined control signal lines of the control signal lines for switching paths among them.

According to another gist of this invention, a method of performing a soft-handover in a mobile communication system comprises the steps of receiving at a first base station controller a field strength report signal transmitted by a mobile terminal which communicates with another terminal through the first base station controller. A step of establishing establishes a connection on a connection line connected between the first base station controller and a second base station controller which is connected to a base station indicated by the field strength report signal.

According to still another gist of this invention, a mobile communication system includes first and second base stations having first and second cells adjacent to each other, respectively. The first and the second base stations are connected to a mobile terminal by radio. First and second base station controllers is connected to the first and the second base stations, respectively. The first and the second base station controllers connect the first and the second base stations with a first mobile exchange. The mobile terminal transmits/receives communication signals to/from another terminal through the first base station, the first base station controller, and the first mobile exchange when the mobile terminal locates in the first cell. The mobile communication system comprises a control signal line connected between the first base station controller and the second base station controller to perform soft-handover between the first base station controller and the second base station controller without respect to the first mobile exchange and to put the first base and the second base station controllers into a soft-handover state when the mobile terminal moves from the first cell to the second cell. A connection line is connected between the first base station controller and the second base station controller to translate the communication signals between the first base station controller and the second base station controller in the soft-handover state and to keep the first base station signal controller transmitting/receiving the communication signals to/from the first mobile exchange.

In the mobile communication system, the first and the second base stations periodically broadcast predetermined radio waves. The mobile terminal detects electric field strength of the predetermined radio waves to produce a field strength report signal representative of the electric field strength. Each of the first base station controllers comprises a soft-handover control section to perform the soft-handover on the basis of the field strength report signal. A conversion section converts the communication signals between a first type for the first and the second base stations and a second type for the first mobile exchange. A switching section is connected to the soft-handover control section, the conversion section, the first or the second base station, the connections line, and the control signal line to switch paths among them.

According to further still another gist of this invention, a mobile communication system includes a plurality of mobile terminals, a plurality of base stations each of which has a cell and is connected to each of the mobile terminals through radio communication wave, a plurality of base station controllers each of which is connected to predetermined base stations of the base stations through communication lines to carry out transmission and reception of control signals, speech signals, and data signals to and from the predetermined base stations through the communication lines, and a mobile communication exchange which is connected to each of the base station controllers through a communication line and which controls exchanging operation with the base station controllers, the system performing soft-handover between the base station controllers when the mobile terminal is moved between two cells. The mobile communication system comprises a connection line as a communication line and a control signal line for transmission of control signals both of which connect the base station controllers.

In the mobile communication system, each of the base station controllers comprising a soft-handover control section which establishes the connection line with reference to a received electric field strength at said mobile terminal. A QCELP/PCM conversion section synthesizes QCELP signals of the speech signals and the data signals transmitted/received to and from the mobile terminal via the base station to produce a synthesized signal and converting the synthesized signal into a PCM signal. A switching section carries out path-connection between the communication line connected to the base station, the soft-handover control section, the QCELP/PCM conversion section, the connection line, and the control signal line. The soft-handover control section is connected to a soft-handover control section in another base station controller through the switching section and the control signal line.

DESCRIPTION OF THE PREFERRED EMBODIMENTS

Referring to FIG. 1 through 4, the description will proceed to a mobile communication system according to one embodiment of this invention.

Figure 1:
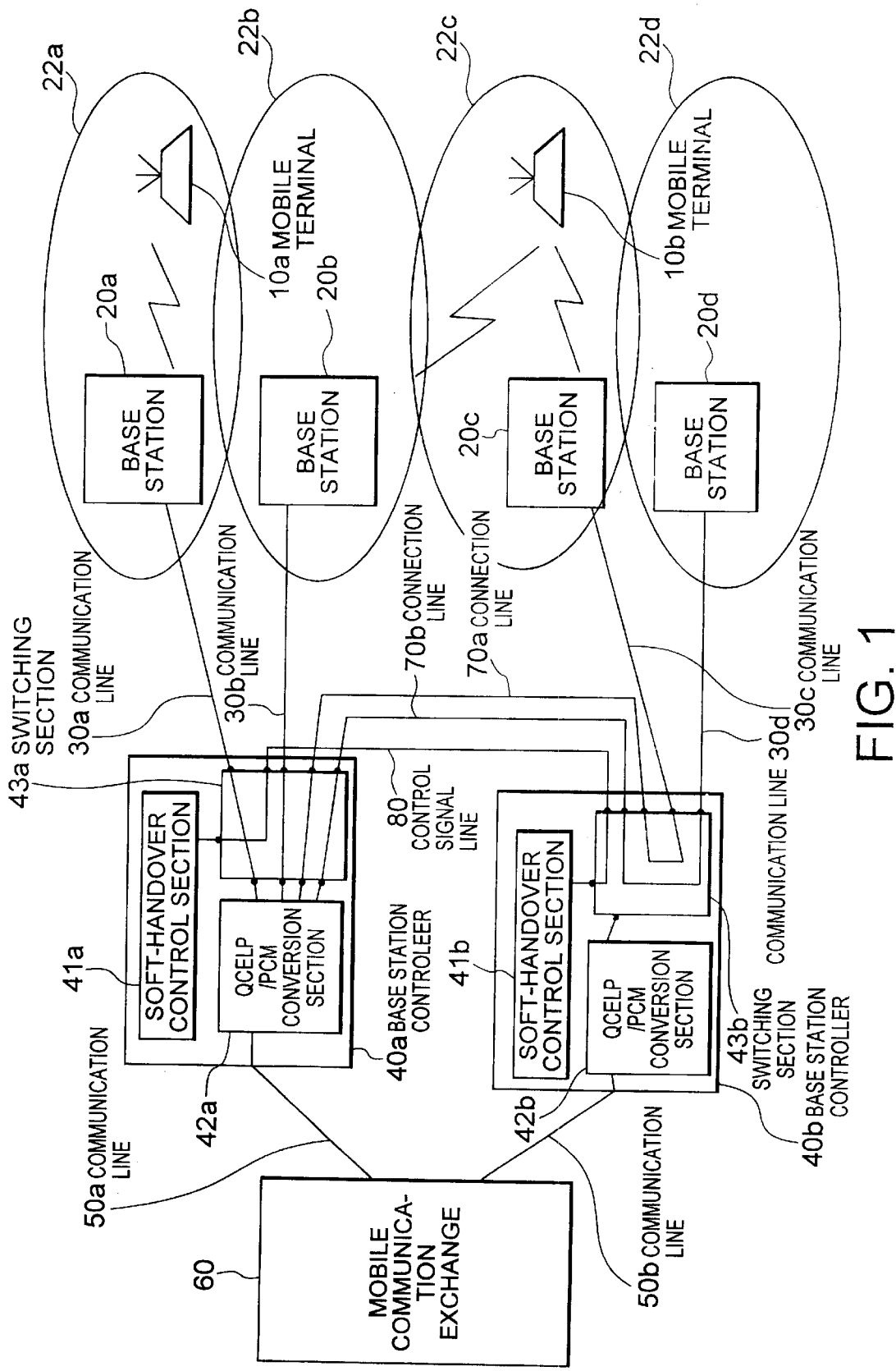
FIG. 1 is a block diagram of a mobile communication system according to an embodiment of the present invention.

FIG. 1 is a block diagram of a mobile communication system according to an embodiment of the present invention.

Referring to FIG. 1, the mobile communication system comprises a plurality of mobile terminals 10a and 10b. Base stations 20a to 20d have cells 22a to 22d, respectively. Each of the base stations 20a to 20d can be connected to each of the mobile terminals 10a and 10b through a radio communication wave when each of the mobile terminals 10a and 10b locates in its cell. The cell 22a is adjacent to the cell 22b and these cells have a common area. The cell 22b is also adjacent to the cell 22c and these cells have another common area. Moreover, the cell 22c is adjacent to the cell 22d and these cells has sill another common area.

A base station controller 40a is connected to the base stations 20a and 20b through communication lines 30a and 30b, respectively. The communication lines 30a and 30b are used for transmission and reception of control signals, speech signals, and data signals between the base station controller 40a and the base stations 20a and 20b, respectively.

Similarly, a base station controller 40b is connected to the base stations 20c and 20d through communication lines 30c and 30d, respectively. The communication lines 30c and 30d is used for transmission and reception of control signals, speech signals, and data signals between the base station controller 40b and the base stations 20c and 20d, respectively.

A mobile communication exchange 60 is connected to the base station controllers 40a and 40b through communication lines 50a and 50b, respectively. The mobile communication exchange 60 controls the exchange between the base station controllers 40a and 40b, between the base station controller 40a or 40b and another mobile communication exchange (not shown), and between the base station controller 40a or 40b and another network (not shown).

The base station controller 40a and the base station controller 40b are connected to each other via connection lines 70a and 70b as communication lines and via a control signal line 80 through which the control signals are transmitted and received.

The base station controller 40a comprises a soft-handover control section 41a, a QCELP/PCM (Qualcomm Code-Excited Linear Prediction/Pulse Code Modulation) conversion section 42a, and a switching section 43a which is connected to both the soft-handover control section 41a and the QCELP/PCM conversion section 42a. The switching section 43a is connected to the communication lines 30a and 30b, the connection lines 70a and 70b, and the control signal line 80.

The switching section 43a switches paths among the communication lines 30a and 30b, the connection lines 70a and 70b, the control signal line 80, the soft-handover control section 41a, and QCELP/PCM conversion selection 42a. For example, the switching section 43a may selectively connect the communication line 30a to the QCELP/PCM conversion section 42a or the connection line 70a. The switching section 43a may selectively connect the communication line 30b to the QCELP/PCM conversion section 42a or the connection line 70b. Moreover, the switching section 43a may connect the connection lines 70a and 70b to the QCELP/PCM conversion section 42a. In addition, the switching section 43a may connect the soft-handover control section 41a to the control signal line 80 if it carry out as the occasion demands. In FIG. 1, the switching section 43a connects the communication lines 30a and 30b and the connection lines 70a and 70b to the QCELP/PCM conversion section 42a and connects the soft-handover control section 41a to the control signal line 80.

Similarly, the base station controller 40b comprises a soft-handover control section 41b, a QCELP/PCM conversion section 42b, and a switching section 43b which is connected to both the soft-handover control section 41b and the QCELP/PCM conversion section 42b. The switching section 43b is connected to the communication lines 30c and 30d, the connection lines 70a and 70b, and the control signal line 80.

The switching section 43b switches paths among the communication lines 30c and 30d, the connection lines 70a and 70b, the control signal line 80, the soft-handover control section 41b, and QCELP/PCM conversion selection 42b. For example, the switching section 43b may selectively connect the communication line 30c to the QCELP/PCM conversion section 42b or the connection line 70b. The switching section 43d may selectively connect the communication line 30c to the QCELP/PCM conversion section 42b or the connection line 70b. Furthermore, the switching section 43b may connect the connection lines 70a and 70b to the QCELP/PCM conversion section 42b. In addition, the switching section 43b may connect the soft-handover control section 41b to the control signal line 80 if it carry out as the occasion demands. In FIG. 1, the switching section 43b connects the communication lines 30c and 30d to the connection lines 70a and 70b, respectively, and connects the soft-handover control section 41b to the control signal line 80.

Hereinbelow, the description will be made about the soft-handover processing in the mobile communication system having the above-mentioned structure.

At first, during communication with one of the base stations 20a–20d, the mobile terminal 10a continuously watches predetermined radio waves, such as pilot signals, transmitted from all of the base stations 20a–20d. When the mobile terminal 10a receives the stronger radio wave than that sent from the base station communicating with it, field strength report information representative of the electric field strength measured at the mobile terminal 10a is reported through the base station communicating with it to the base station controller 40a or 40b connected to the base station communicating with it.

Next, the mobile terminal 10a receives a soft-handover execution request signal from the base station controller 40a or 40b. In this event, the mobile terminal 10a transmits a soft-handover execution notice signal through the communicating base station to the base station controller 40a or 40b.

Then, the base station controller 40a or 40b performs soft-handover with respect to a cell ID in the soft-handover execution notice signal. The communication is kept by two of the base stations 20a–20d.

In order to disconnect the communication, the mobile terminal 10a transmits a disconnection request signal through the communicating base station(s) to the base station controller 40a or 40b. The base station controller 40a or 40b receives the disconnection request signal. Then, the base station controller 40a or 40b transmits a disconnection response signal through the communicating base station(s) to the mobile terminal 10a. The communication comes to an end at the time when the disconnection response signal is received at the mobile terminal 10a. When the disconnection request signal is transmitted from the mobile communication exchange 60 to the mobile terminal 10a through the base station controller 40a or 40b and the communicating base station(s), the mobile terminal 10a which has received the disconnection request signal transmits the disconnection response signal to bring the communication to an end.

During the communication, the communicating base station(s) transmits/receives control signals and speech or data signals in a radio zone between the communicating base station(s) and the mobile terminal 10a and to/from the communication line 30a, 30b, 30c, or 30d between the communicating base station(s) and the base station controller 40a or 40b.

Each of the base station controllers 40a and 40b establishes a radio channel by the use of a channel establishment request signal which is transmitted to the base station(s) 20a–20d and releases the radio channel by the use of a channel release request signal. In the base station controller 40a, communication signals transmitted from the communicating base stations are supplied to the QCELP/PCM conversion section 42a through the switching section(s) 43a (and 43b). The QCELP/PCM conversion section 42a synthesizes the speech signals or the data signals supplied thereto to produce a synthesized signal which is transmitted to the mobile communication exchange 60 connected thereto.

Thereafter, the communication signal transmitted from the mobile communication exchange 60 is supplied to the QCELP/PCM conversion section 42a. The QCELP/PCM conversion section 42a distributes the speech signal or the data signal which is transmitted through the switching section(s) 43a (and 43b)to the communicating base stations.

The soft-handover control section 41a stores cell ID information including cell IDs assigned to the base stations 20a and 20b together with related cell IDs assigned to neighboring base stations which are neighboring to each of the base station 20a and 20b. It is unnecessary that the neighboring base stations are connected to the base station controller 40a. Similarly the soft-handover control section 41b stores cell ID information including cell IDs assigned to the base stations 20c and 20d together with related cell IDs assigned to neighboring base stations which are neighboring to each of the base station 20c and 20d. It is unnecessary that the neighboring base stations are connected to the base station controller 40b.

The electric field strength report measured at the mobile terminal 10a and transmitted therefrom is analyzed at the base station controllers 40a or 40b. When the cell at which the mobile terminal 10a is currently positioned is the cell of the base station under the neighboring base station controller, the soft-handover between the base station controllers is started.

The switching sections 43a and 43b carry out connection of the connection lines 70a and 70b.

Then, the electric field strength report signal transmitted from the mobile terminal 10a is received by the base station controller 40a. At the same time, the base stations 20a–20d are selectively supplied through the communication lines 30a–30d with the channel establishment/channel release request signal.

The base station controller 40a as an origination of the soft-handover performs, through the control signal line 80 for the control signal to/from the base station controller 40b, transmission of a request signal for starting the soft-handover between the base station controllers, transmission of a request signal for the cell ID analysis, transmission of a request signal for channel establishment for a relevant base station, transmission of a request signal for ending the soft-handover between the base station controllers, reception of a start response signal, reception of a cell ID analysis response signal, reception of a channel establishment response signal, and reception of end response signal from the base station controller 40b.

On the other hand, the base station controller 40b as a destination of the soft-handover performs, through the control signal line 80 for the control signal to/from the base station controller 40a, reception of the start request signal of the soft-handover, reception of the cell ID analysis request signal, reception of the channel establishment request signal of the relevant base station, reception of the end request signal of the soft-handover between the base station controllers, transmission of the start response signal to the base station controller 40a as the origination of the soft-handover, transmission of the cell ID analysis response signal, transmission of the channel establishment response signal, and transmission of the end response signal to the base station controller 40a.

Thereafter, the mobile communication exchange 60 performs mobile communication exchange of the speech signal and the data signal to/from the base station controllers 40a and 40b, or connection to the base station controllers 40a and 40b and to other exchange networks.

Now, description will be made in detail about the above-mentioned soft-handover in conjunction with the case where the mobile terminal 10a moves from the cell 22a to the cell 22b.

Figure 2:
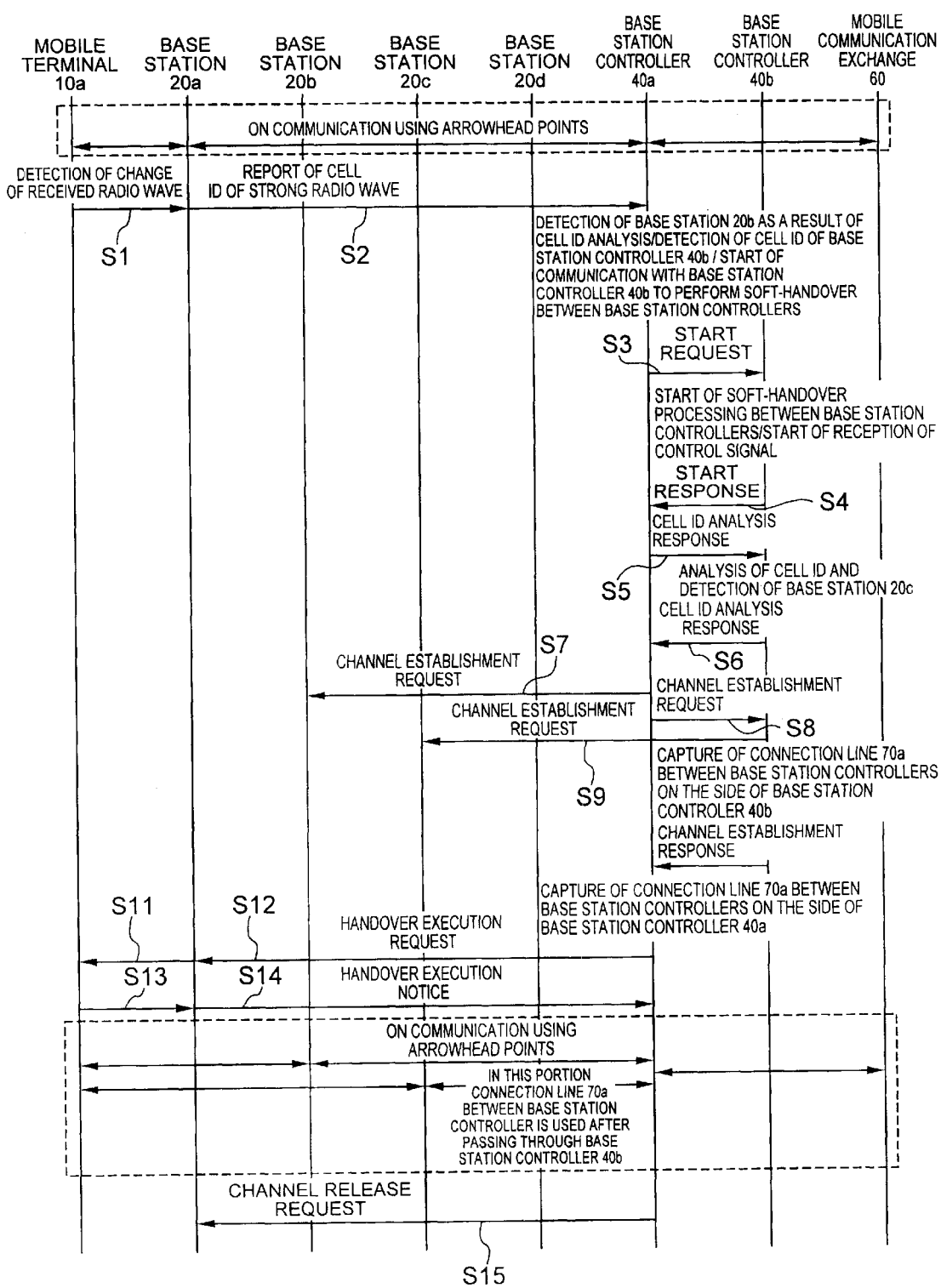
FIG. 2 is a signal sequence chart for describing soft-handover processing in the mobile communication system of FIG. 1.

FIG. 2 is a view for explaining the soft-handover process performed at the mobile communication system shown in FIG. 1 in case where the mobile terminal 10a is moving from the cell 22a to the cell 22b.

When the mobile terminal 10a performs communication within the cell 22a, the communication is carried out by using of the base station 20a, the communication line 30a, the switching section 43a, the QCELP/PCM conversion section 42a, and the mobile communication exchange 60.

When the mobile terminal 10a moves toward the cell 22b, the radio wave (or the pilot signal) transmitted from each of the base stations 20b and 20c and received the mobile terminal 10a becomes strong. In other words, the mobile terminal 10a receives the radio wave transmitted from each of the base stations 20b and 20c with high level of electric field strength. The electric field strength is measured and a report of the measured electric field strength is reported to the base station 20a by radio (step S1). The report signal includes the cell IDs of the base stations 20b and 20c except for the cell ID of the base station 20a.

The report signal reported to the base station 20a is also reported through the communication line 30a to the base station controller 40a (step S2).

Then, the base station controller 40a analyzes the report signal and detects the cell IDs. One of the cell IDs is coincident with the cell ID of the base station 20b and another one is coincident with the cell ID of the base station 20c controlled by the base station controller 40b connected to the base station controller 40a through the control signal line 80.

Next, the soft-handover control section 41a within the base station controller 40a is started and transmits through the control signal line 80 to the base station controller 40b the request signal for starting the soft-handover between the base station controllers (step S3). Hereafter, transmission and reception of the control signals between the base station controller 40a and the base station controller 40b are all carried out through the control signal line 80.

When the base station controller 40b receives the request signal for starting the soft-handover between the base station controllers, the soft-handover control section 41b in the base station controller 40b is started and linking of the control signals to be transmitted/received is carried out.

Thereafter, the base station controller 40b transmits through the control signal line 80 to the base station controller 40a the response signal to the request signal for starting the soft-handover between the base station controllers (step S4).

When the base station controller 40a receives the response signal to the request signal for starting the soft-handover between the base station controllers, it transmits the cell ID analysis request signal to the base station controller 40b (step S5).

When the base station controller 40b receives the cell ID analysis request signal, it analyzes the cell ID. Then, the cell ID of the base station 20c as the result of the analysis is transmitted to the base station controller 40a together with the cell ID analysis response signal (step S6).

When the base station controller 40a receives the cell ID analysis response signal, it transmits the channel establishment request signal to the base station 20b (step S7).

The base station controller 40b is also supplied with the channel establishment request signal (step S8).

When the base station controller 40b receives the channel establishment request signal, it supplies the base station 20c with the channel establishment request signal (step S9).

Next, the switching section 43b in the base station controller 40b carries out the path connection between the connection line 70a, which is formed between this base station controller and the base station controller 40a, and the communication line 30c. Then, the channel establishment response signal is transmitted to the base station controller 40a (step S10).

When the base station controller 40a receives the channel establishment response signal, the switching section 43a in the base station controller 40a carries out the path establishment between the connection line 70a and the QCELP/PCM conversion section 42a.

Thereafter, the base station controller 40a transmits through the communication line 30a to the base station 20a the soft-handover execution request signal carrying the cell ID of each of the base stations 20b and 20c which became available in communication (step S11).

Thereafter, the soft-handover execution request signal transmitted to the base station 20a is sent from the base station 20a to the mobile terminal 10a by radio (step S12).

When the mobile terminal 10a receives the soft-handover execution request signal, it transmits a soft-handover execution notification signal to the base station 20a (step S13).

After the soft-handover execution notification signal is transmitted from the mobile terminal 10a, the mobile terminal 10a performs the soft-handover to the cell ID designated by the soft-handover execution request signal. At this time instant, the mobile terminal 10a is put into a soft-handover state communication lines through the base station 20b—the communication line 30b and through the base station 20c—the communication line 30c—the switching section 43c—the connection line 70a.

When the base station 20a receives the soft-handover execution notification signal, it transmits the soft-handover execution notification signal through the communication line 30a to the base station controller 40a (step S14).

Thereafter, the base station controller 40a sends a channel release request signal through the communication line 30 to the base station 20a in order to release the channel of the base station 20a which is no longer used (step S15).

Then, the switching section 43a in the base station 20a releases the path between the communication line 30a and the QCELP/PCM conversion section 42a. Thus, in the base station 20a, the channel to which the release request signal is addressed is released.

Hereinbelow, description will be made about the processing where the mobile terminal 10a is moved from the cell 22b to the cell 22d.

Figure 3:
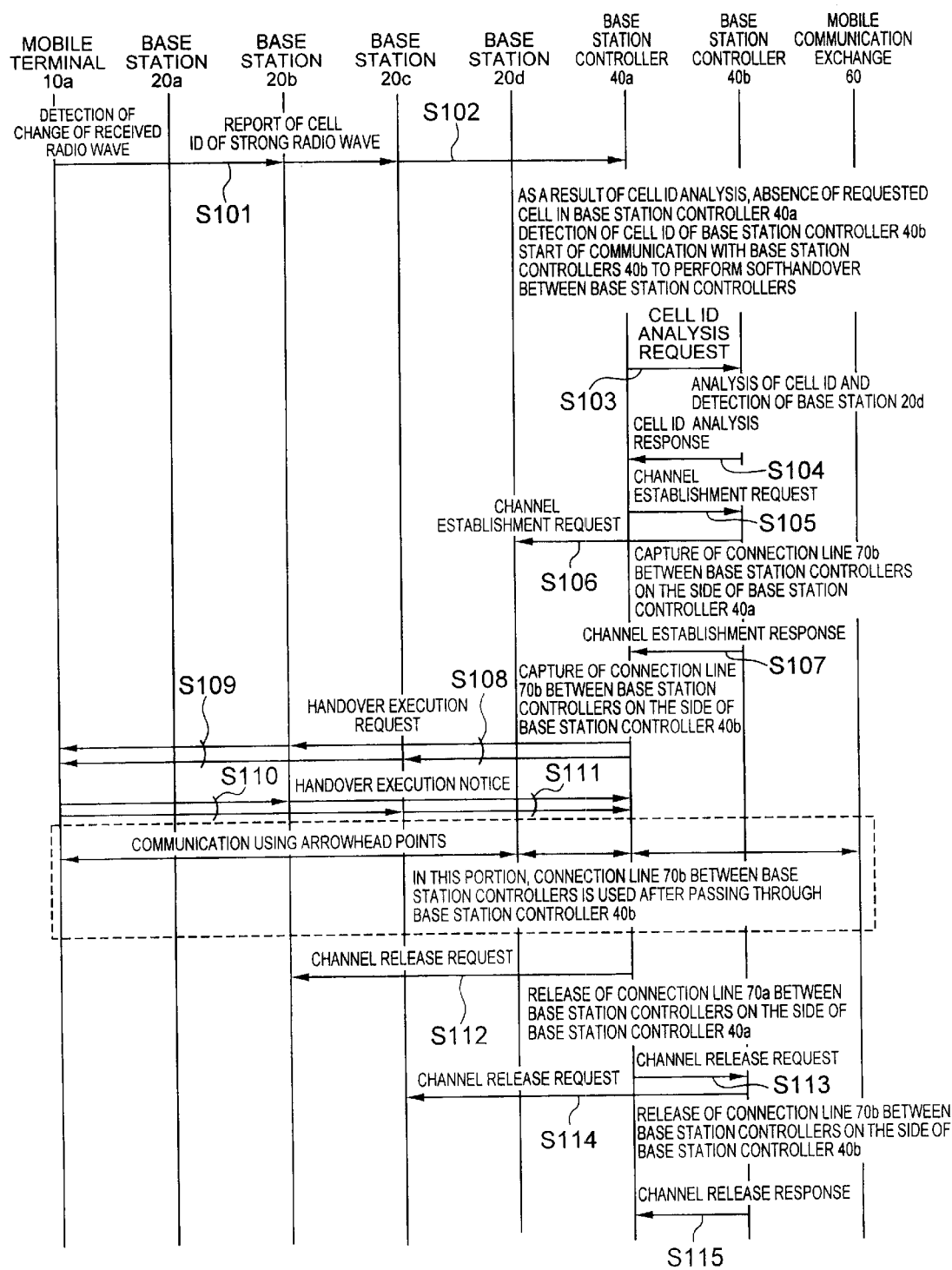
FIG. 3 is a signal sequence chart for describing soft-handover processing in the mobile communication system of FIG. 1.

FIG. 3 is a view for describing the soft-handover processing in the mobile communication system shown in FIG. 1 in case where the mobile terminal 10a is moved from the cell 22b toward the cell 22d.

When the mobile terminal 10a moves into the cell 22c, it receives the radio wave transmitted from each of the base stations 20b and 20c with high level of electric field strength and the electric field strength is measured. However, since the cell IDs added to the report signal of the measured electric field strength are not changed from the current cell IDs, the communication is continued without reporting the cell IDs.

When the mobile terminal 10a moves into the cell 22d and leaves form the cell 22c, it receives the radio wave transmitted from the base station 20d with high level of electric field strength. The electric field strength is measured and the measured electric field strength is reported to the base stations 20b and 20c by radio (step S101).

The report signal of the electric field strength reported to the base station 20b is also reported through the communication line 30b to the base station controller 40a while the report signal of the electric field strength reported to the base station 20c is also reported through the communication line 30c and the control signal line 80 to the base station controller 40a (step S102).

Then, the base station controller 40a analyzes the report signal to detect that the cell ID is not coincident with the cell ID of the base station controller 40a but is coincident with the cell ID of the base station on the base station controller 40b.

Then, the base station controller 40a transmits the cell ID analysis request signal to the base station controller 40b (step S103).

When the base station controller 40b receives the cell ID analysis request signal, it analyzes the cell ID. Then, the cell ID of the base station 20d as the result of the analysis is transmitted to the base station controller 40a together with the cell ID analysis response signal (step S104).

When the base station controller 40a receives the cell ID analysis response signal, it transmits the channel establishment request signal to the base station 40b (step S105).

When the base station controller 40b receives the channel establishment request signal, it supplies the base station 20d with the channel establishment request signal (step S107).

Next, the switching section 43b in the base station controller 40b carries out the path establishment for the connection line 70b, which is formed between this base station controller and the base station controller 40a, and the communication line 30d. Then, the channel establishment response signal is transmitted to the base station controller 40a (step S107).

When the base station controller 40a receives the channel establishment response signal, the switching sections 43a in the base station controller 40a carries out path establishment for the connection line 70b and the QCELP/PCM conversion section 42a.

Thereafter, the base station controller 40a transmits through the communication channel 30b and the control signal line 80 to the base stations 20b and 20c, respectively, the soft-handover execution request signal carrying the cell ID of the base station 20d which has become available in communication (step S108).

The soft-handover execution request signal transmitted to each of the base stations 20b and 20c is sent from the base stations 20b and 20c to the mobile terminal 10a by radio (step S109).

When the mobile terminal 10a receives the soft-hand-over execution request signal, it transmits a soft-hand-over execution notice signal to each of the base stations 20b and 20c (step S110).

After the soft-handover execution notice signal is transmitted from the mobile terminal 10a, the mobile terminal 10a performs the soft-handover upon the cell ID designated by the soft-handover execution request signal. At this time instant, the mobile terminal 10a is put into a soft-handover state having a communication line through the base station 20d—the communication line 30d—the switching section 43b—the connection line 70b to the base station controller 40a.

When the base stations 20b and 20d receive the soft-handover execution notice signal, this notice signal is transmitted to the base station controller 40a from the base station 20b through the communication line 30b and from the base station 20d through the communication line 30b, the soft-handover control section 41b, and the control signal line 80 (step S111).

Thereafter, the base station controller 40a sends the channel release request signal through the communication line 30b to the base station 20b in order to release the channel of the base station 20b which is no longer used (step S112).

Then, the switching section 43a in the base station controller 40a releases the paths between the QCELP/PCM conversion section 42a and the communication line 30b and through the QCELP/PCM conversion section 42a and the connection line 70a. Thus, in the base station 20b, the channel to which the release request signal is addressed is released.

Thereafter, the base station controller 40a sends a channel release request signal to the base station controller 40b (step S113).

When the base station controller 40b receives the channel release request signal, it transmits the channel release request signal through the communication line 30c to the base station 20c.

Then, the switching section 43b in the base station controller 40b releases the path between the connection line 70a and the communication line 30c. Accordingly, in the base station 20c, the channel to which the channel release request signal is addressed is released. The base station controller 40b transmits the channel release response signal to the base station controller 40a (step S115).

As described above, when the QCELP/PCM conversion section 42a in the base station controller 40a is used and if the base station under the control of the base station controller 40a is no longer used, the communication can be carried out without switching the QCELP/PCM conversion section 42a.

Hereinbelow, description will be made about the processing where the mobile terminal 10a finishes the communication in the cell 22d.

Figure 4:
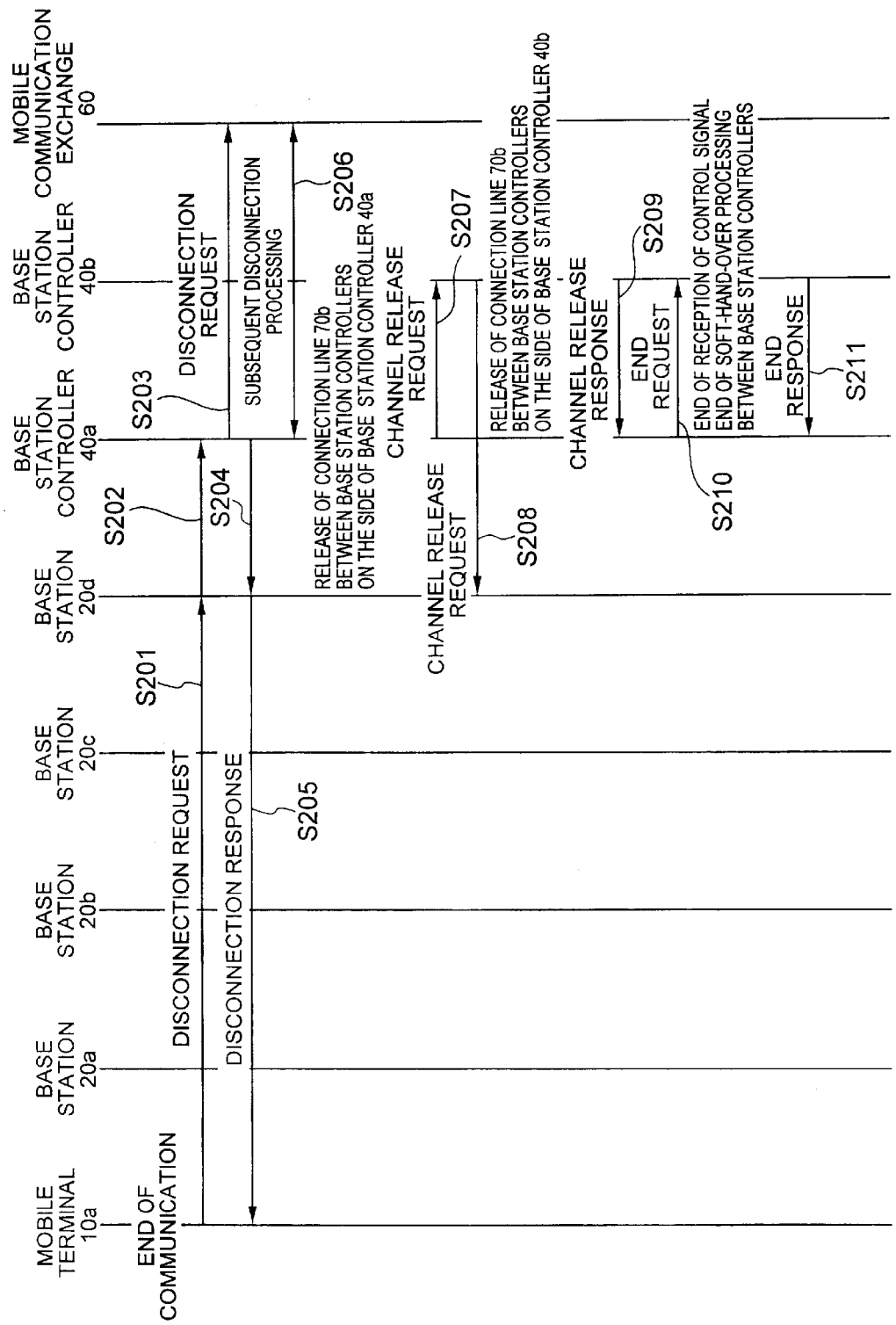
FIG. 4 is a signal sequence chart for describing soft-handover processing in the mobile communication system of FIG. 1.

FIG. 4 is a view for describing the processing in the mobile communication system shown in FIG. 1 in case where the mobile terminal 10a finishes the communication in the cell 22d.

When the mobile terminal 10a finishes the communication in the cell 22d, it at first transmits the disconnection request signal to the base station 20d (step S201).

When the base station 20d receives the disconnection request signal, it transmits the disconnection request signal to the base station controller 40a (step S202).

When the base station controller 40a receives the disconnection request signal, it transmits the disconnection request signal to the mobile communication exchange 60 (step S203). Simultaneously, a disconnection response signal is transmitted through the control signal line 80, the soft-handover control section 41b, and the communication line 30d from the base station controller 40a to the base station 20d (step S204).

The disconnection response signal transmitted to the base station 20d is transmitted to the mobile terminal 10a by radio (step S205). At this stage, the mobile terminal 10a finishes the communication and transmission/reception for the communication.

Next, the switching section 43a in the base station controller 40a releases the path between the QCELP/PCM conversion section 42a and the connection line 70b. The channel release request signal is transmitted from the base station controller 40a to the base station controller 40b (step S207).

When the base station controller 40b receives the channel release request signal, it transmits the channel release request signal to the base station 20d (step S208). The switching section 43b in the base station controller 40b releases the path between the connection line 70b and the communication line 30d.

After the path is released, the base station controller 40b transmits the channel release response signal to the base station controller 40a (step S209).

Thereafter, when all the communication resources are released, the base station controller 40a transmits the end request signal for ending the soft-handover between the base station controllers to the base station controller 40b (step S210).

When the base station controller 40b receives the end request signal, the base station controller 40b finishes the linking of the control signals upon the transmission/reception already performed. The end response signal is transmitted to the base station controller 40a (step S211). Thus, the soft-handover processing between the base station controllers is brought to an end.

The above-described soft-handover processing comprising a series of steps may be written in a recording medium, such as an ROM, which is provided in each of the soft-handover control sections 41a and 41b.

As mentioned above, the mobile communication system has the connection lines and the control signal line which are arranged between a plurality of base station controllers. In the soft-handover control section arranged within each base station controller, the connection line is established with reference to the received electric field strength in the mobile terminal. The switching section in the base station controller performs a path-connection among the communication line, the soft-handover control section, the QCELP/PCM conversion section, the connection line, and the control signal line. The soft-handover control section is connected to another soft-handover control section in the other base station controller through the switching section and the control signal line, and establishes the connection line to the base station controller connected to the base station which has transmitted the radio wave received at the mobile terminal with high levels electric field strength.

As described above, the soft-handover processing is carried out by the signal transmission among the base station controllers. Therefore, it is not necessary for each of the base station controllers to have the cell ID analysis information of the whole system. The soft-handover is realized by having the analysis information of only the base station controller itself and the neighboring base station. In addition, by providing the control signal line, the connections lines between the base station controllers, it is not necessary to provide the mobile communication exchange with new lines or to additionally provide a device for synthesis of speech/data signals between the base station controllers through the mobile communication exchange.

Figure 5:
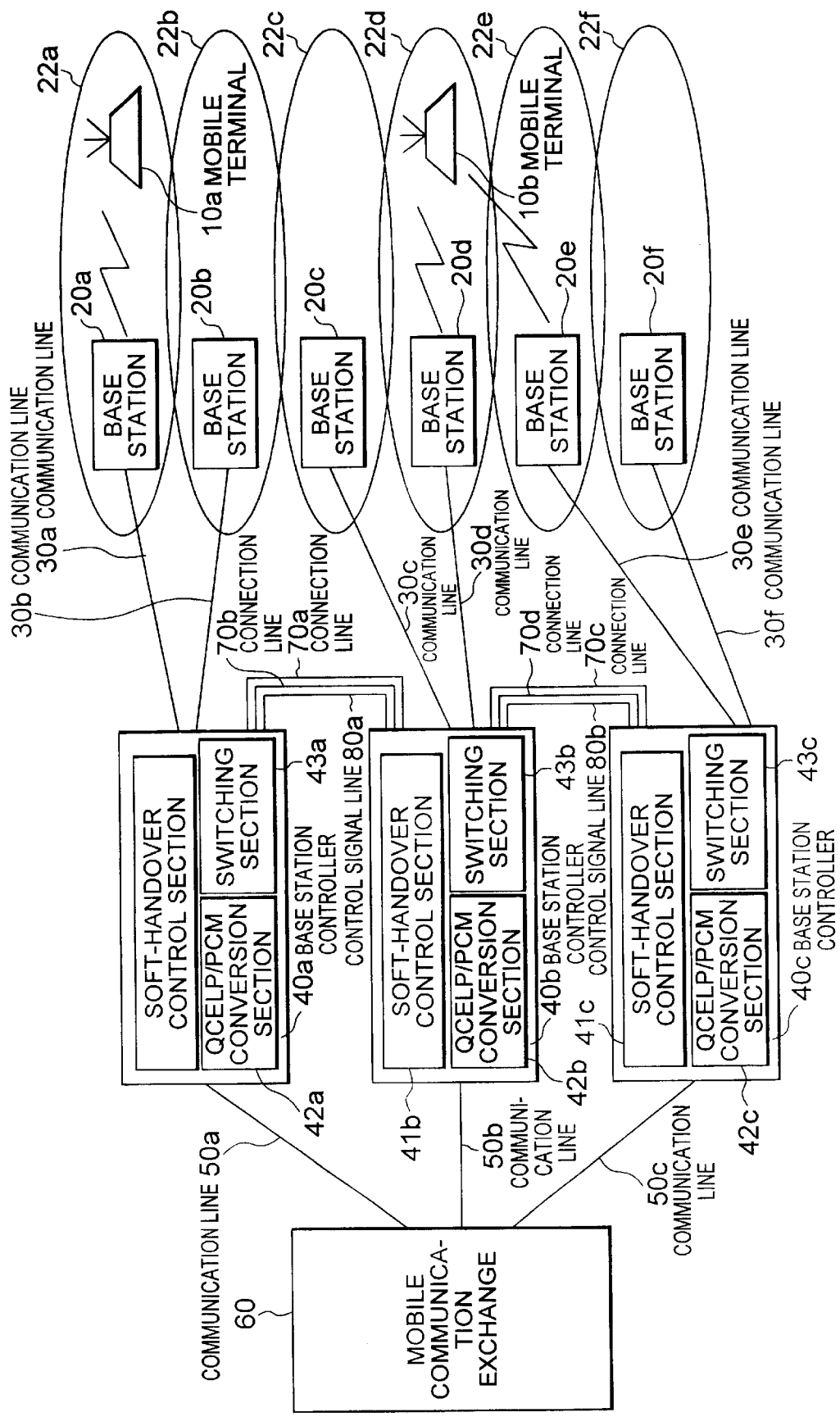
FIG. 5 is a block diagram of a mobile communication system according to another embodiment of the present invention.

FIG. 5 is a view showing a communication system according to another embodiment of the present invention. The structure illustrated in the figure includes a single soft-handover origination (41b) and two soft-handover destinations (41a, 41c).

The embodiment illustrated in FIG. 1 has a structure including a single soft-handover origination and a single soft-handover destination. In case where a single soft-handover origination and two soft-handover destinations are included as shown in FIG. 5, similar processing is carried out.

It is assume that the mobile terminal 10a start on communicating with another terminal (or a system user) through the base station controller. When the QCELP/PCM conversion section 42a is used and if the base station under the control of the base station controller 40a is no longer used, the communication can be carried out without switching the QCELP/PCM conversion section 42a. This is true even if the mobile terminal moves into a cell 22e and/or 22f. This is because the communication is kept through a base station(s) 20e or (or and) 20f, a switching section 43c, a connection line(s) 70c or (or and) 70d, the switching section 43b, the connection line(s) 70a or (or and) 70b.

The present invention having the above-described structure has the following effects.

The connection line is established between the base station controllers and a single QCELP/PCM conversion section is used without being switched. Therefore, the soft-handover between the base station controllers may be carried out without interruption.

The synthesizing process is performed on the ordinary operation in the base station controller without changing the operation of the mobile communication exchange. Therefore, it is not necessary to provide a new device for performing the combining process.

The cell ID is analyzed at a particular base station controller which controls the current position of the mobile terminal. Therefore, it is not necessary for each of the base station controllers to have the cell ID analysis information of the whole system. The soft-handover processing can be carried out by holding only the cell ID analysis information which is controlled by the base station controller itself and the analysis information of the neighboring base station in order to transmit/receive the cell ID analysis request signals.

Figure 6:
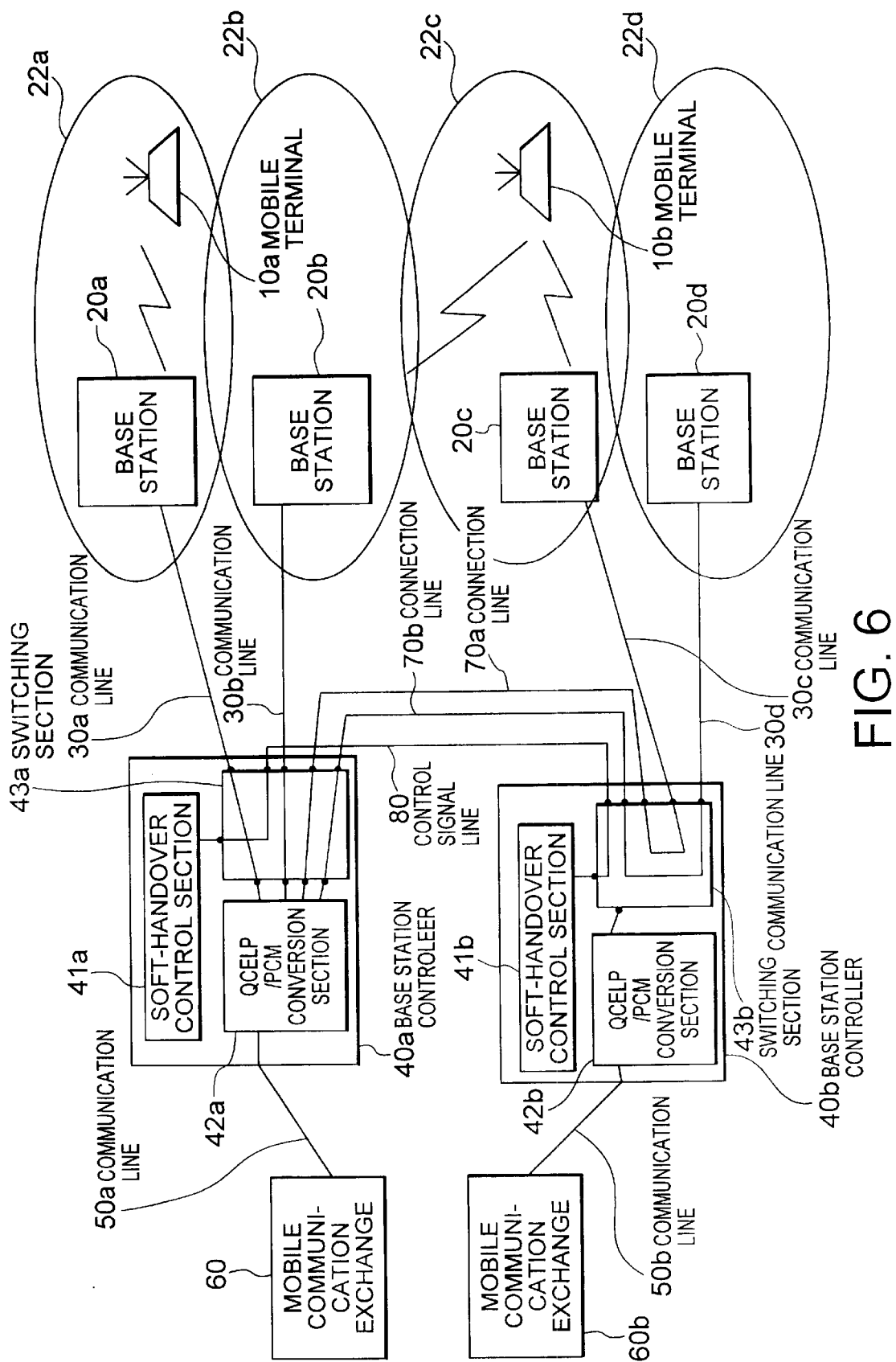
FIG. 6 is a block diagram of a mobile communication system according to still another embodiment of the present invention.
Figure 7:
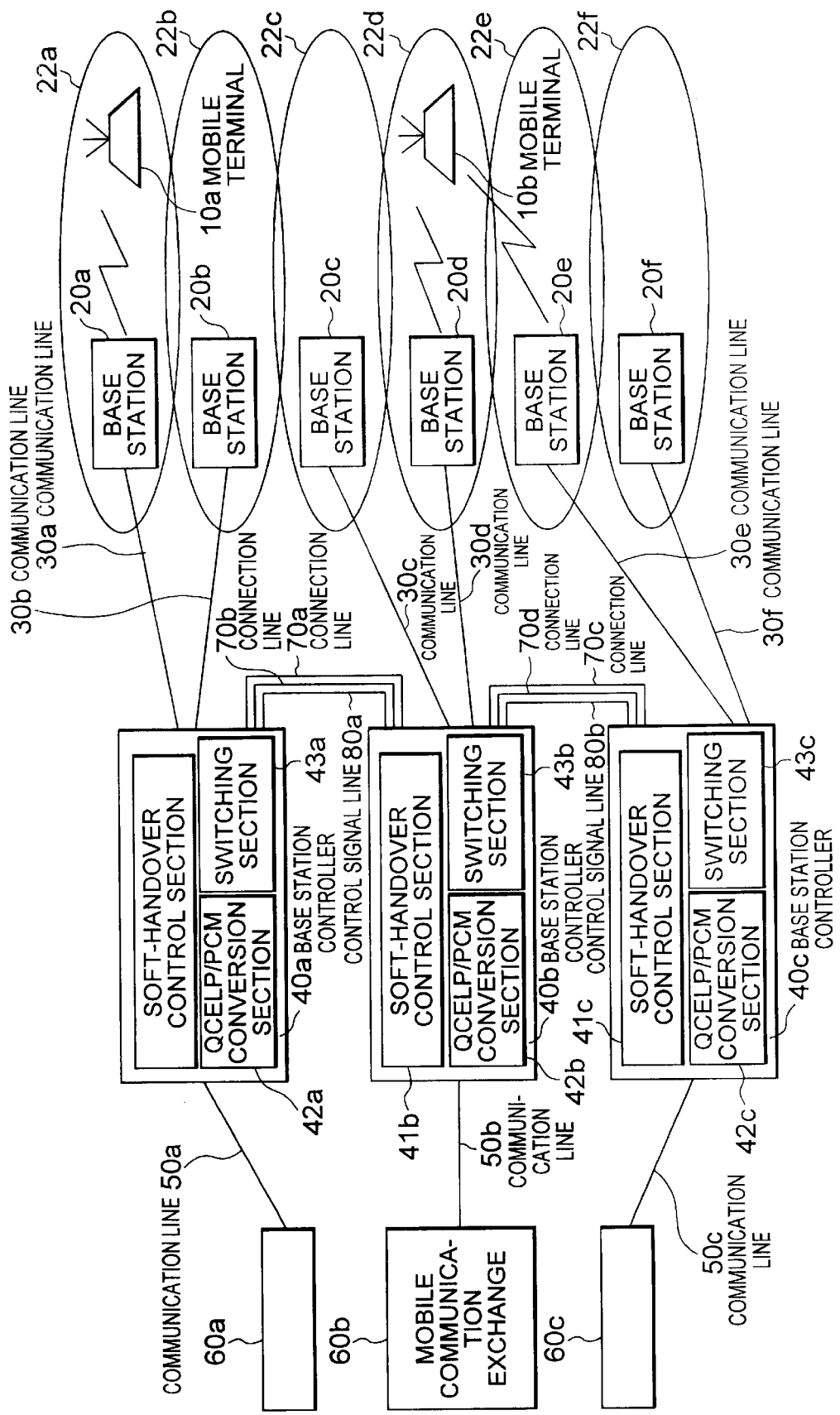
FIG. 7 is a block diagram of a mobile communication system according to further still another embodiment of the present invention.

While this invention has thus for been described in conjunction with the preferred embodiments thereof, it will readily be possible for those skilled in the art to put this invention into practice in various other manners. For example, the base station controller 40b (of FIG. 1 or 5) may be connected to another mobile communication exchange different from the mobile communication exchange 60 as shown in FIG. 6. Similarly, the base station controller 40c (of FIG. 5) may be connected to still another mobile communication exchange different form both of the mobile communication exchange 60 and the other mobile communication exchange connected to the base station controller 40b as shown in FIG. 7. Moreover, the mobile communication system may have four or more base station controllers. In this case, each of the base station controllers is connected to other base station controllers each of which cover a cell adjacent to a cell covered by it.

What is claimed is:

1. A mobile communication system including a plurality of base stations including cells for being connected to through which a mobile terminal may be connected by radio, and a plurality of base station controllers connected between said base stations and a mobile exchange, said mobile communication system comprising:

control signal lines connected among said base station controllers operable to transmit control signals to perform soft-handover and to put corresponding base station controllers into a soft-handover state independent of said mobile exchange when said mobile terminal moves between cells; and connection lines connected among said base station controllers operable to maintain communication between said mobile terminal and another terminal in the soft-handover state;

each of said base station controllers operable to maintain transmitting/receiving communication signals to/from said mobile exchange during the soft-handover state regardless of the location of said mobile terminal, when the communication starts through said mobile exchange.

2. A mobile communication system as claimed in claim 1, wherein said mobile communication system further comprises one or more other mobile exchanges, each of said base station controllers connected to any one of the mobile exchanges.

3. A mobile communication system as claimed in claim 1, said base stations broadcasting predetermined radio waves over said cells, respectively, said mobile terminal detecting the predetermined radio waves to produce a field strength report signal representative of the detected predetermined radio waves, wherein each of said base station controllers comprises:

a soft-handover control section for performing the soft-handover on the basis of the field strength report signal;

a conversion section for converting the communication signals between a first type which is for said base stations and a second type which is for said mobile exchange; and a switching section connected to said soft-handover control section, said conversion section, predetermined ones of said base stations, predetermined ones of said connection lines of said base stations, and predetermined ones of said control signal lines for switching paths among them.

4. A mobile communication system as claimed in claim 3, wherein each said soft-handover control section establishes a plurality of connections on said connection lines connected among the base station controller including it and other base station controllers, on the basis of the field strength report signal.

5. A method of performing a soft-handover in a mobile communication system, said method comprising the steps of:

receiving at a first base station controller a field strength report signal transmitted by a mobile terminal which communicates with another terminal through said first base station controller;

establishing a connection on a connection line connected between said first base station controller and at least a second base station controller which is connected to a base station indicated by field strength report signal;

establishing a connection on at least two connection lines connected between a first mobile exchange and each of said first base station and said at least a second base station; and maintaining communication with said mobile terminal through said first base station controller and said first mobile exchange throughout the soft-handover regardless of which base station in said mobile communication system said mobile terminal communicates with.

6. A method as claimed in claim 5, wherein the step of establishing a connection includes a step of establishing a plurality of connections on connection lines according to a plurality of base stations indicated by the field strength report signal.

7. A mobile communication system including first and second base stations having first and second cells adjacent to each other, respectively, through which a mobile terminal may be connected by radio, and first and second base station controllers connected to said first and said second base stations, respectively, which in turn connect said first and said second base stations with a first mobile exchange, said mobile terminal operable to transmit and receive communication signals to/from another terminal through said first base station, said first base station controller, and said first mobile exchange when said mobile terminal is located in the first cell, said mobile communication system comprising:

a control signal line connected between said first base station controller and said second base station controller for performing soft-handover between said first base station controller and said second base station controller independent of said first mobile exchange to put said first base and said second base station controllers into a soft-handover state when said mobile terminal moves from said first cell to said second cell; and a connection line connected between said first base station controller and said second base station controller for operable to transmit the communication signals between said first base station controller and said second base station controller in the soft-handover state in order to maintain communication through said first base station controller and said first mobile exchange.

8. A mobile communication system as claimed in claim 7, wherein said second base station controller is connected to a second mobile exchange different from said first mobile exchange instead of said first mobile exchange.

9. A mobile communication system as claimed in claim 7, said first and said second base stations periodically broadcasting predetermined radio waves, said mobile terminal detecting electric field strength of the predetermined radio waves to produce a field strength report signal representative of said electric field strength, wherein each of said first and said second base station controllers comprises:

a soft-handover control section for performing the soft-handover on the basis of the field strength report signal;

a conversion section for converting the communication signals between a first type which is for said first and said second base stations and a second type which is for said first mobile exchange; and a switching section connected to said soft-handover control section, said conversion section, one of said first and said second base stations, said connection line, and said control signal line for switching paths among them.

10. A mobile communication system has including a plurality of mobile terminals, a plurality of base stations each of which includes a cell through which each of said mobile terminals may be connected by a radio communication wave, a plurality of base station controllers each of which is connected to predetermined ones of said plurality of base stations through communication lines operable to carry out transmission and reception of control signals, speech signals, and data signals to and from said predetermined ones of said base stations through said communication lines, a mobile communication exchange which is connected to each of said base station controllers through a communication line and which is operable to control an exchanging operation with said base station controllers, and a system operable to perform soft-handover between one of said plurality of base station controllers when one of said mobile terminals is moved between two cells, said mobile communication system comprising:

a connection line as a communication line and a control signal line for transmission of control signals both of which are connected between said base station controllers; and said system operable to perform soft-handover operative to maintain communication between said one of said plurality of mobile terminals, a particular one of said plurality of base station controllers in communication with said one of said plurality of mobile terminals just prior to the time when such mobile terminal is moved between two cells and said mobile communication exchange throughout the soft-handover process.

11. A mobile communication system as claimed in claim 10, each of said base station controllers comprising:

a soft-handover control section which establishes said connection line in response to a received electric field strength at said mobile terminal;

a QCELP/PCM conversion section for synthesizing QCELP signals from the speech signals and the data signals transmitted/received to and from said mobile terminal via said base station to produce a synthesized signal and converting the synthesized signal into a PCM signal; and a switching section for path-connection between a particular one of said plurality of communication lines connected to a particular predetermined one of said plurality of base stations, said soft-handover control section, said QCELP/PCM conversion section, said connection line, and said control signal line;

said soft-handover control section being connected to another soft-handover control section in another one of said plurality of base station controllers through said switching section and said control signal line.

12. A mobile communication system as claimed in claim 11, said mobile communication system further comprising one or more other connection lines as communication lines which are connected between said base station controllers, wherein said soft-handover control section establishes a plurality of connection lines to one of said base station controllers connected to particular ones of said plurality of base stations which have transmitted the radio waves received at a particular one of said mobile terminals with high levels of electric field strength.

13. A soft-handover processing method in a mobile communication system claimed in claim 12, the method comprising the steps of:
   measuring at said particular one of said plurality of mobile terminals the received electric field strength of the radio waves transmitted from said particular ones of said plurality of base stations;
   reporting the result of the measurement to a particular one of said base station controllers through a particular communicating base station; and
   establishing, in response to said result of the measurement, a plurality of connection lines between base station controllers connected to said particular ones of said plurality of base stations which have transmitted radio waves received at said particular one of said plurality of mobile terminals with high levels of electric field strength.

14. A soft-handover processing method as claimed in claim 13, the method further comprising the steps of:
   reporting, to said particular one of said base station controllers, said result of the measurement together with identification codes given to the base stations which have transmitted radio waves received at said particular one of said plurality of mobile terminals with high levels of electric field strength;
   establishing, with reference to said result of the measurement and the identification codes, a plurality of connection lines between the base station controllers connected to the particular ones of said plurality of base stations which have transmitted radio waves received at said particular one of said plurality of mobile terminals with high levels of electric field strength.

15. A recording medium containing said soft-handover processing method claimed in claim 14.

* * * * *